United States Patent Office 3,033,554
Patented May 8, 1962

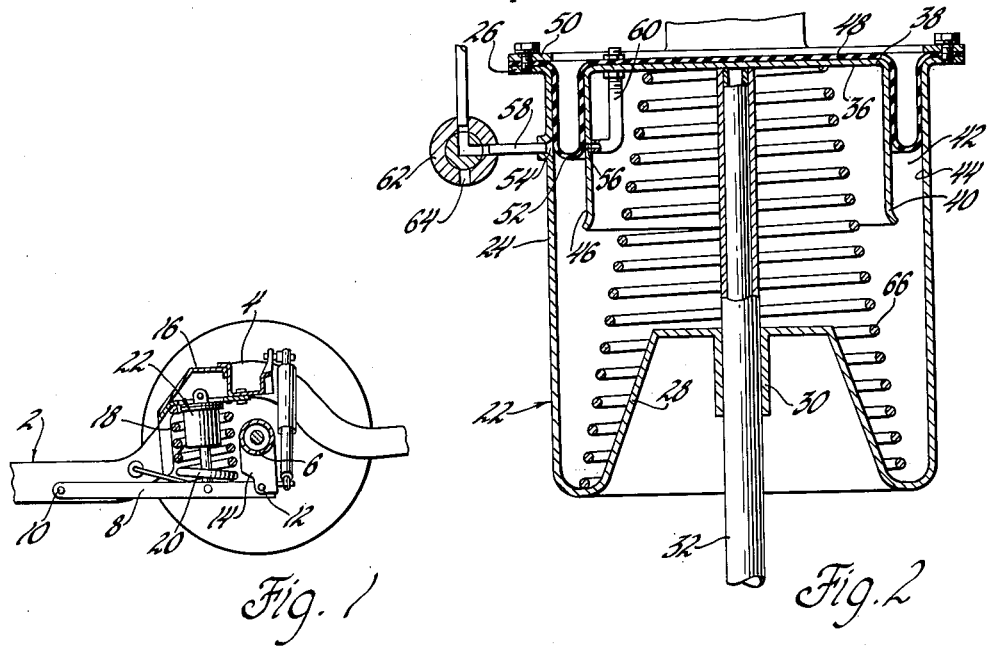

3,033,554
VACUUM SPRING WITH DISABLING CONTROL
Philip L. Francis, Pontiac, Mich., assignor to General Motors Corporation, Detroit, Mich., a corporation of Delaware
Filed Sept. 26, 1960, Ser. No. 58,451
2 Claims. (Cl. 267—34)

This invention relates to vacuum energized auxiliary springs for vehicle suspension and more particularly to means for selectively rendering such springs completely inactive.

An object of the present invention is to provide an improved vehicle suspension.

Another object is to provide in a vehicle suspension of the type utilizing an auxiliary spring in parallel with the main suspension spring, means for completely deactivating the helper spring so that the normal sprung load is supported exclusively by the main suspension spring.

A still further object is to provide a vacuum energized auxiliary spring which is constructed and arranged so that when vented to atmosphere, the mechanical function thereof is modified so that no spring rate is derived therefrom incident to vertical deflection of the sprung mass relative to the unsprung mass.

Yet a further object is to provide a device of the stated character in which the auxiliary spring comprises a telescoping piston and cylinder connected by a rolling lobe diaphragm, the piston being operatively connected to the vehicle unsprung mass by a telescoping piston rod assembly which upon introduction of atmospheric pressure into the spring allows the piston to be displaced axially away from a portion of the rod assembly by a light coil spring, whereby subsequent vertical deflection of the sprung and unsprung mass causes reciprocation of the other portion of the piston rod only.

These and other objects, advantages and features of the invention will become more fully apparent as reference is had to the accompanying specification and drawings wherein:

FIG. 1 is a fragmentary side elevational view of a portion of a vehicle suspension utilizing a main coil spring and a vacuum auxiliary spring constructed in accordance with the invention;

FIG. 2 is an enlarged sectional elevational view illustrating the details of construction of the vacuum spring, showing the relative arrangement of parts when the spring is in an active or operating condition; and FIG. 3 is a view similar to FIG. 2 illustrating the relative arrangement of parts when the spring is in a totally deactivated condition.

Referring now to the drawings and particularly FIG. 1, the reference numeral 2 designates the side rail portion of a vehicle frame which includes an upwardly bowed portion 4, beneath which extends a rear axle 6. Axle 6 is articulatably connected to frame 2 by a longitudinally extending link 8, the forward end of which is pivotally connected at 10 to frame 2, while the rearward end thereof is pivotally connected at 12 to a depending bracket 14 secured to axle 6. Disposed between a bracket 16 on frame kick-up 4 and an intermediate portion of link 8 is a composite suspension spring 18 which acts to support the sprung mass of the vehicle relative to the unsprung mass. Composite spring 18 comprises a main coil sprung mass. Composite spring 18 comprises a main coil spring 20 and a vacuum energized helper spring 22 which is disposed concentrically within coil spring 20. Helper spring 22 is of the type which offers increasing resistance as the load on the sprung mass of the vehicle is increased, and vice versa. In the present invention, the coil spring 20 preferably supports the rear end of the vehicle under no-load conditions without assistance from the helper spring 22; that is, the helper spring is activated only after a predetermined descent of the sprung mass relative to the unsprung mass, after which the effective rate provided by the helper spring increases proportional to increase in load applied to the sprung mass.

In accordance with the present invention, the vacuum energized helper spring 22 is constructed and arranged so that it may be totally deactivated under the no-load or curb weight condition. As seen best in FIGS. 2 and 3, spring 22 comprises an upright cylinder 24 having an open upper end bounded by a radially outwardly directed flange 26 and having a closed upwardly deformed bottom wall 28 which has centrally attached thereto a vertically directed guide sleeve 30. Slidably disposed in sleeve 30 is a tubular piston rod 32, the lower end of which is articulatably connected to control link 8. Telescopingly received in tubular piston rod 32 is a second piston rod 34, the upper end of which is attached, as by welding, to the lower surface 36 of the top wall 38 of an inverted cup-shaped piston 40. Piston 40 is reciprocable within cylinder 24 in concentric relation therewith and is dimensioned so as to provide an annular interval 42 between the inner side wall 44 of the cylinder and the outer side wall 46 of the piston. Annular interval 42 is closed by a single convolution rolling lobe type diaphragm 48. The central portion of diaphragm 48 overlies top wall 38 of piston 40, while the outer peripheral edge thereof is secured to flange 26 of cylinder 24 by a clamp ring 50. The intermediate annular lobe portion 52 of diaphragm 48 extends downwardly into overlapping engagement with a port 54 in cylinder side wall 44 and a port 56 in piston side wall 46. Port 54 is connected by conduit 58 to a source of vacuum, not shown, while port 56 is connected in communicating relation with atmosphere by an L-shaped conduit 60 which extends through the top wall 36 of piston 38. Inasmuch as the normal functional characteristics and mode of operation of spring 22 are identical to those of the spring construction disclosed in my copending application Serial No. 813,160, entitled "Self-Leveling Fluid Spring," now Patent No. 2,998,244, further description thereof will be omitted.

According to one feature of the invention, vacuum conduit 58 has interposed therein a manually operated valve 62 which is movable from a first position, shown in FIG. 2, providing communication with the source of vacuum, to a second position, shown in FIG. 3, in which the interior of the spring is vented to atmosphere through passage 64, while normal communication with the source of vacuum is cut off. It will be apparent that manipulation of valve 62 to the position shown in FIG. 3 will result in disablement of the normal function of spring 22, since no subatmospheric pressure can be created in the interior of the spring 22 as long as the path to the source of vacuum is blocked. However, it will be apparent that if piston 38 were required to reciprocate within cylinder 24 under these conditions, the atmospheric pressure contained within the spring would be subjected to varying compression, depending upon the deflected position of the piston, and would therefore introduce undesired change in the rate of the primary spring 20. Therefore, in accordance with another feature of the invention, a light helical spring 66 is disposed in compression between the bottom wall 28 of cylinder 24 and the lower surface 36 of piston 38. Spring 66 exerts sufficient force on piston 38 to displace the latter vertically to the position shown in FIG. 3 when the interior of spring 22 is vented to atmosphere. It will be evident from FIG. 3 that the action of spring 66 results in axially displacing the lower surface of the piston a considerable distance from the upper end of tubular piston rod 32. Consequently, normal vertical deflection of the vehicle axle and control arm to which tubular rod 32 is connected may occur without causing corresponding upward and downward deflection of piston 38. As a result, the atmospheric pressure contained within the spring is not subjected to compression and the rate of the primary coil spring is in no wise affected. Furthermore, the construction eliminates any possibility of buckling of the diaphragm lobe portion 52 which would otherwise occur as a result of downward deflection of piston 38. To restore the auxiliary spring 22 to normal operation, valve 62 is manipulated back to the position shown in FIG. 2 which restores communication between the source of vacuum, not shown, and the interior of the spring. As soon as a subatmospheric condition has been created within the spring cylinder sufficient to overcome spring 66, piston 38 descends with rod 34 until engagement with the upper end of tubular rod 32 is accomplished. Thereafter, the normal self-leveling operation of the vacuum spring resumes so that the load supporting capability of the composite spring varies in accordance with increase and decrease in the load imposed on the vehicle sprung mass.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A vacuum spring assembly comprising a cylinder and piston arranged in telescoping relation with an annular interval therebetween closed by a rolling lobe diaphragm, means for varying the level of subatmospheric pressure in said spring, guide means on said cylinder, a piston rod assembly slidably disposed in said guide means, said assembly including a first member fixed to said piston and a second member in telescoping relation with said first member and normally axially abutting said piston, said second member being movable in said guide means away from said piston, and a coil spring disposed between said piston and cylinder effective to move said piston away from said second member when the pressure in said spring approaches atmospheric pressure.

2. A composite spring comprising a coil spring and a vacuum energized fluid spring arranged concentrically within said coil spring, said vacuum spring having a cylinder and piston arranged in telescoping relation with an annular interval therebetween closed by a rolling lobe diaphragm, means responsive to relative displacement of said cylinder and piston for varying the level of subatmospheric pressure in said spring, said cylinder having a closed bottom formed with a tubular guide, a piston rod assembly slidably disposed in said guide means, said assembly including a first member fixed to said piston and a second member surrounding said first member and normally axially abutting said piston, said second member being movable on said first member away from said piston, and a coil spring disposed between said piston and cylinder effective to move said piston away from said second member only when the pressure in said spring approaches atmospheric pressure.

References Cited in the file of this patent
UNITED STATES PATENTS

| | | |
|---|---|---|
| 1,840,178 | Transom | Jan. 5, 1932 |
| 1,918,697 | Gruss | July 18, 1933 |
| 2,216,327 | Smith | Oct. 1, 1940 |
| 2,427,927 | Schutte | Sept. 23, 1947 |